April 19, 1966  N. E. HANDEL  3,247,376
DEVICE FOR PRODUCING A MODULATED BEAM OF BETA OR X-RADIATION
Filed May 5, 1961  2 Sheets-Sheet 1
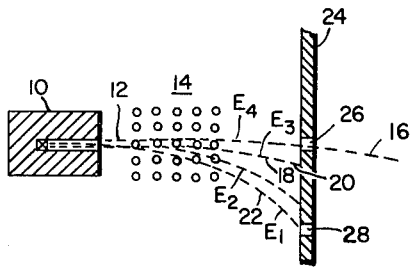
*Fig. 1*
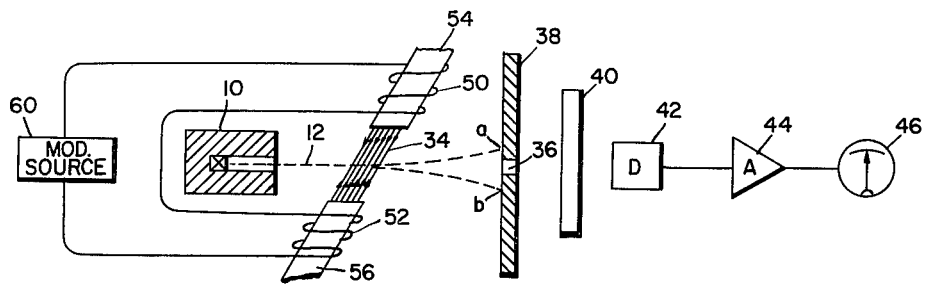
*Fig. 2*
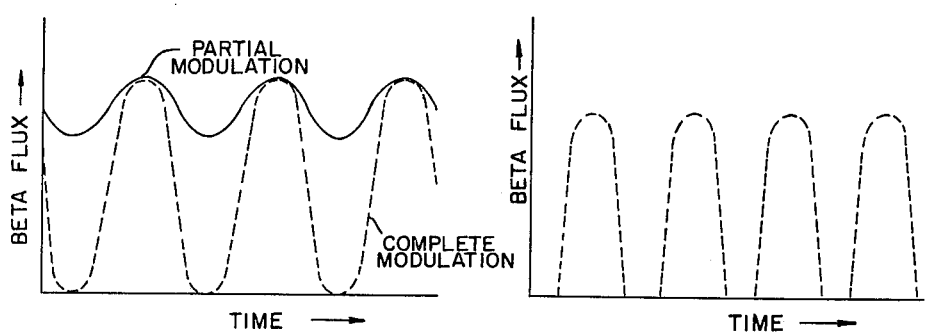
*Fig. 3a*  *Fig. 3b*
INVENTOR
Neil E. Handel
ATTORNEY April 19, 1966     N. E. HANDEL     3,247,376
DEVICE FOR PRODUCING A MODULATED BEAM OF BETA OR X-RADIATION
Filed May 5, 1961     2 Sheets-Sheet 2

INVENTOR

Neil E. Handel

ATTORNEY

United States Patent Office 3,247,376
Patented Apr. 19, 1966

3,247,376
DEVICE FOR PRODUCING A MODULATED BEAM OF BETA OR X-RADIATION
Neil E. Handel, Davenport, Iowa, assignor to Industrial Nucleonics Corporation, a corporation of Ohio
Filed May 5, 1961, Ser. No. 108,041
5 Claims. (Cl. 250—49.5)

This invention relates to apparatus utilizing a beta particle source and more particularly relates to the control of a beta beam emitted from a radioactive source by the application of a magnetic field thereto, so as to provide an improved source of beta rays or target generated X-rays.

Beta rays emitted from radiative material, such as krypton-85 or strontium-90, have been used as a radiation source for gauges that measure thickness, weight, density, or profile of various materials or products. These beta ray sources are generally constructed by locating the beta emitting material in a shielded housing which has an opening or active area from which a beam of beta rays is derived.

Radiation type measuring systems usually rely for their operation upon a determination of how much radiation has been absorbed by a tested product. These systems in their simplest form comprise a radiation source, a radiation detector and an indicating device. The current output developed by the radiation detector is very small and it is therefore usually necessary to also include an amplifier between the detector and indicator so that a voltage of measurable proportions will be applied to the indicator. As the radiation source provides a substantial constant intensity signal the amplifiers used in these measuring systems are of the direct current variable type. Amplifiers of this type are very sensitive and are subject to drift. For these reasons, it is sometimes desirable to provide an alternating current signal so that AC amplifiers may be used. To obtain an alternating current signal at the detector, it is necessary that the intensity of the radiation directed at the detector be made to vary continuously. The U.S. patent to Henry R. Chope, No. 2,790,945 issued on April 30, 1957, illustrates a rotatable mechanical shutter system which is used to continuously modulate the intensity of the radiation emitted from radioactive source for the aforementioned reasons.

Beta particles which are emitted from the beta sources of the type mentioned above usually possess a wide range of energy values. While such a source is suitable for many applications, there are certain measuring and testing instruments which require beta rays having only a specified energy value. Although monoenergetic beta sources, such as a betatron, are currently available, cost and size economies usually prohibit their use in these instruments.

Beta emitters are generally insufficient for measurements of heavier materials and it is necessary to use a gamma ray source or X-ray source. Practical radioisotopes are available that emit gamma rays at an energy value which makes these gamma rays useful as a radioactive source for radiation gauges. The problems associated with the construction of these sources are more complex than those associated with beta sources due to the greater penetrative power of gamma radiation. Correspondingly, the control of these sources, such as intensity modulation of the emitted gamma radiation or the construction of a shutter system, becomes increasingly more complex and costly. The available radioisotopes often do not have the necessary emission energy and half-life characteristics for a given measurement application.

In accordance with this invention there is provided a beam of beta particles which is obtained from a radioactive material that is placed in a shielded container to form a collimated source. The beam is directed at a shield which has either a single or group of openings for passing the beta beam or portions thereof through the shield. A magnetic field is provided between the source and shield which is perpendicular to the beta beam. This field deflects each beta particle according to the energy level of the particle and acts to separate the composite beta beam into a plurality of beta beams, each of which contains beta particles at a single energy level. The plurality of beta beams strike the shield and are either emitted or blocked depending on the location of the openings in the shield.

This invention further contemplates the use of a modulated beta beam to obtain a controlled radiation source and to help minimize some of the problems associated with the construction and control of radiation sources for many different types of applications. A modulated beta beam is formed by applying a continuously varying magnetic field perpendicular to a beta beam which in turn continuously deflects the entire beam past a window of a shield. The radiation emitted from the window as the beam is so deflected is intensity modulated. This modulated beta beam, in one embodiment, is used to produce a modulated X-ray source by target techniques. Other embodiments are disclosed wherein a modulated beta beam is controlled in such a manner as to produce an effective beta or X-ray strip source. In addition, an effective absorbing shutter for a beta source is described using the magnetic deflection system as a source of control over the emitted radiation.

It is an object of the present invention to provide an improved system for modulating a beam of beta or X-radiation.

It is another object of this invention to provide a method and apparatus for physically separating beta particles emitted from a beta source according to the energy levels of the particles so that particles of optimum energy levels may be selected for use as desired.

It is a further object of the present invention to provide a magnetic modulation system for producing a modulated beam of bremsstrahlung target-generated X-rays having a selected maximum energy level.

It is a still further object of this invention to provide a method and apparatus for producing an effective strip source of either beta or X-radiation.

It is still another object of the present invention to provide an effective shutter for use with a beta emitter source.

It is another object of this invention to provide a modulated beam of beta or X-radiation for use with radiation gauges.

It is a further object of the present invention to provide a method of producing a modulated monoenergetic beta source having a selectable energy level from a beta source which emits beta rays having a wide energy distribution.

Further objects and advantages will be apparent from the following detailed description taken in conjunction with the appended drawing in which:

FIGURE 1 shows an apparatus for the separation of beta particles according to their energy levels by a magnetic field of constant intensity.

FIGURE 2 is a simplified showing of a magnetic beta beam modulator which is used as a source for a radiation gauge.

FIGURES 3a and 3b are graphs showing examples of the modulation obtainable with the described magnetic modulator.

Figure 4:
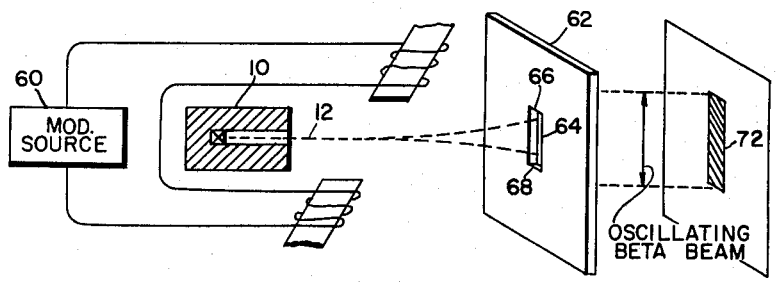
FIGURE 4 illustrates a method of producing an effective beta strip source by the application of a magnetic field to continuously deflect a beta beam.

In FIGURE 1, the numeral 10 indicates a radioactive source adapted to emit a collimated beam of beta rays or high energy electrons 12. The terms "electrons" and "beta rays" are used interchangeably in the following description as they essentially designate the same particles. Beta particles emitted from radioactive sources generally are nether monoenergetic nor homogeneous, in that there are neither monoenergetic nor homogeneous, in that there energy levels.

The beta beam 12 emitted from the source 10 is directed at a radiation shield 24 through a steady magnetic field 14, shown perpendicular to the plane of the paper in FIGURE 1. The radiation shield 24 is constructed of any suitable material and is of sufficient thickness to block any beta particles from passing therethrough. The beta particles composing the beta beam 12 are deflected by the magnetic field 14 in accordance with the energy level of the particles and the direction and intensity of the magnetic field. The lower the energy of the beta particles passing through a steady magnetic field, the greater is the deflection. FIGURE 1 shows the most energetic beta particles, at an energy value designated $E_4$, traveling along the deflection path 16 after interacting with the magnetic field 14. Lower energy betas, having an energy value of $E_3$, travel along path 18 toward the shield 24. In like manner, betas of still lower energy levels, such as $E_2$ and $E_1$, correspondingly are deflected a greater extent by the magnetic field and travel along the deflection paths 20 and 22, respectively. The shield 24 is constructed with apertures, such as at 26 and 28, through which beta particles lying in a narrow energy range are selected for emission. A selected energy range of beta particles can be obtained by providing an aperture in the shield 24 that corresponds with the selected energy level. The size of the window in the shield will determine the maximum and minimum energy level of the betas emitted from each window. Of course, it is to be understood that many more windows may be provided in radiation shield 24 and that any one or more of these windows may be used at any one time to pass beta particles having preselected energy values.

An alternative arrangement for operation of the apparatus of FIG. 1 which may be utilized to obtain a source of beta particles having a particular energy level, is to provide a single window in the shield which will emit beta particles at the lowest desirable energy level using a relatively weak magnetic field. Beta particles at higher energy levels are obtained from this single window by increasing the intensity of the magnetic field to the extent necessary so that higher energy betas will be deflected and directed at this single output window.

A modulator for a beta source is illustrated in FIGURE 2. Beta particles are emitted from a collimated source 10, in a beam 12, and are directed at an aperture 36 in a shield 38. The beta particles passing through the aperture 36 may be used in a measuring system to determine characteristics such as the weight or density of an article or product 40. The particles penetrating the product 40 are detected by a radiation detector 42 whose output is amplified and indicated by elements 44 and 46, respectively. The radiation detector 42 may be of any suitable type such as an ionization chamber or a Geiger counter tube. As previously mentioned, with an unmodulated radiation source the signal detected is a direct current variable signal. In many applications it is desirable to provide an alternating current signal so that A.C. amplifiers instead of D.C. amplifiers may be used in conjunction with the detector 42. To permit the use of A.C. amplifiers previous systems provided a modulated beta source which was obtained by using a mechanical chopper or a rotating shutter system between the source and the detector.

Modulation of the beta beam emitted from the source 10 is accomplished by a deflecting magnetic field 34 which is produced by a pair of coils 50, 52, iron coil return paths 54, 56 and a modulating voltage source 60. The vertical deflection of the beta beam, illustrated in FIGURE 2, is obtained by locating the magnetic field 34 perpendicular to both the beam 12 and to the plane of the paper, as shown in FIGURE 1. To illustratively convey this arrangement in FIGURE 2, the axes of the coils and the magnetic field are shown at an angle. Of course, if the magnetic field is rotated 90 degrees, so that it is parallel to the plane of the paper, the beta beam will be deflected horizontally rather than vertically as shown in FIGURE 2.

The source 60 amplitude modulates the intensity of magnetic field 34 in accordance with the current that it causes to flow through coils 50 and 52. When this current is approximately equal to zero, the beta beam 12 passes through window 36 of the shield 38. As the current in coils 50, 52 increases, the beta beam 12 is deflected upward or downward, as at $a$ or $b$ in accordance with the direction and intensity of the applied magnetic field 34. A modulated beam is therefore obtained from window 36 by continuously deflecting the beta beam, back and forth, across the window 36. This continuous deflection is caused by the continuous variations in the magnetic field produced by the pulsating voltage source 60.

The modulation of the beta beam is dependent upon the degree of its deflection and may be a simple partial modulation in a sinusoidal manner or a complete modulation also sinusoidal as shown in FIGURE 3a. Bursts of radiation, shown in FIGURE 3b, may also be obtained by the application of extremely large voltages to coils 50 and 52 sufficient to deflect the entire beta ray beam beyond the region of aperture 36. Any desired degree or form of modulation may be obtained by impressing a corresponding waveform on the coils 50, 52 with the source 60.

The system shown in FIGURE 2 may also be used as an effective shutter system. That is, without any current passing through coils 50, 52 the beta beam 12 passes through window 36 to penetrate the product 40. When it is desired to shut this beam "off," a large voltage is applied to coils 50, 52 to establish a constant magnetic field of sufficient intensity to deflect the entire beta beam so that no beta particles will pass through window 36.

FIGURE 4 illustrates the application of the magnetic deflection system for obtaining an effective beta ray strip source. This type of source is useful in measuring systems where measurements are to be made over an elongated area of a product. Beta beam 12 is directed at an elongated slot 64 in a shield 62. The beam is continuously deflected by the changing magnetic field between the uppermost portion 66 and the lowermost portion 68 of the slot 64. The oscillating beta beam passing from the window 64 therefore produces an elongated illuminated area 72 on the target or product to be measured.

Figure 5:
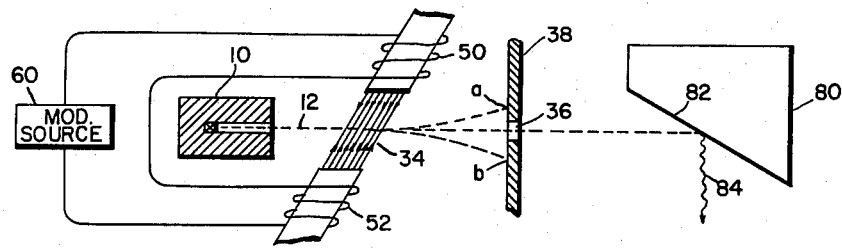
FIGURE 5 is a showing of the application of a modulated beta beam for producing a modulated X-ray source by target techniques.

FIGURE 5 illustrates the application of magnetic deflected beta particles or electrons to produce modulated bremsstrahlung or target generated X-radiation. It is known in the art that a useful beam of electromagnetic radiation may be produced by irradiating a target of preselected characteristics with beta rays. The target may be any of a variety of materials, such as, for example, carbon, aluminum, iron and copper. A discussion of the type of radioactive beta emitting source, target thickness and material, etc., that may be incorporated herein to produce X-rays by this target technique is found in U.S. Patent No. 2,933,606, issued on April 19, 1960, to G. B. Foster et al.

The beta beam 12 passes through the deflecting magnetic field 34 which is produced by the voltage impressed on coils 50, 52 from source 60. A modulating voltage from the source 60 varies the intensity of the deflecting magnetic field 34, and causes the beta beam to sweep back and forth across the window 36, emitting a modulated beta beam from the window. The modulated beta beam strikes surface 82 of target 80 and undergoes radiative collisions with the nuclei of the target, which results in the emission of electromagnetic radiation 84. As the intensity of the X radiation produced by target techniques is related to the intensity of the beta beam, the X radiation by this target technique is likewise modulated.

An effective X strip source is obtained by sweeping the beta particles in the plane normal to the paper in FIG. 5 over a specified area of the target by the technique described in FIGURE 4. The effective shutter described in conjunction with the beta source can also be used as an effective shutter for the X-ray source, as there is no X radiation produced when there are no impinging beta particles on the target 80.

Figure 6:
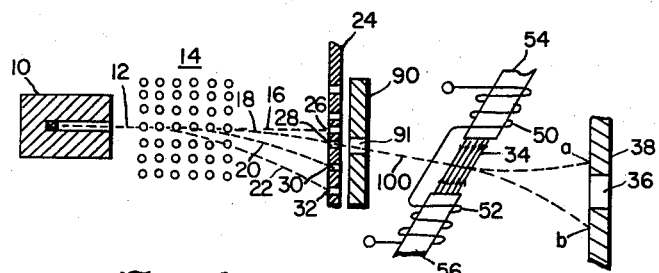
FIGURE 6 illustrates a system for producing a modulated selectable monoenergetic beta source from a radioactive material which emits beta particles having a wide distribution of energy levels.

In FIGURE 6 there is described a system wherein the energy value of the beta particles to be modulated is first selected by the application of a steady magnetic field to a composite beta beam. The beta beam emitted from the source 10 is directed through the magnetic field to the shield 24 and as in FIGURE 1, beta particles of different energy levels travel along the separate deflection paths, noted as paths 16, 18, 20 and 22 to be emitted from the windows 26, 28, 30 and 32, respectively. A second shield 90 with an aperture 91 is aligned with one of the windows in shield 24 so that only beta particles of a selected energy level are emitted past both shields. The beta beam 100 passes through the windows in both shields and is deflected by the magnetic field 34. A modulated beta beam having particles at only the selected energy level is obtained from the window 36 of shield 38.

As shown in FIGURE 3 of U.S. Patent No. 2,933,606, the energy of the gamma radiation produced by target technique is a function of the energy level and number of the impinging beta particles. Therefore, by using the monoenergetic beta beam obtained by the system described in FIGURE 1, it is possible to select, to an extent, the energy level of the emitted X radiation. In a like manner, the modulated monoenergetic beta beam of FIGURE 6 may also be used to produce a modulated X-ray source for deriving high energy photon radiation having a selected maximum energy. This is accomplished by directing the modulated beam obtained at window 36 of FIGURE 6 at a suitable target.

These and other applications of the magnetic deflection system of the present invention will be evident to those skilled in the art. Accordingly, the invention is not limited to the specific embodiments illustrated, as other uses, applications, modifications, adaptations and embodiments may be made without departing from the scope of the invention as is set forth in the appended claims.

What is claimed is:

1. Apparatus for producing modulated X-rays comprising a beta emitting source for producing a narrow beam of beta particles, a radiation absorbing shield having an aperture through which the beta particles may freely pass, said beta source being positioned to direct said beta beam toward the aperture of said shield, deflection means for continuously sweeping said beta beam across the aperture to produce a modulated beta beam emanating through said aperture, and a target positioned in the path of said modulated beta beam, said target comprising a material of preselected characteristics wherein said beta particles in said modulated beta beam undergo radiative collisions with the nuclei of said target to produce modulated X radiation when struck by said modulated beta beam.

2. Apparatus for producing modulated X-rays comprising a collimated beta ray emitting source for producing a narrow beta ray beam, a radiation absorbing shield having an aperture therein, said beta ray source being positioned to direct said beta ray beam toward the aperture of said shield, means for producing a magnetic field of continuously varying intensity in the path of and perpendicular to said beta beam, said magnetic field operating to continuously deflect the beta ray beam across said aperture in said shield to produce a modulated beta ray beam emanating from said aperture, and a target positioned in the path of said modulated beta ray beam, said target comprising a material of preselected characteristics wherein beta particles in said modulated beta ray beam undergo radiative collisions with the nuclei of said target to produce modulated X radiation when said beta ray beam impinges on said target.

3. Apparatus for producing a modulated X-ray beam comprising a source of monoenergetic beta particles, a radiation absorbing shield having a window therein, said monoenergetic beam being directed at said window for transmission therethrough, magnetic deflection means located in the path of the monoenergetic beta beam across the window of said shield thereby producing a modulated monoenergetic beta source from said window, and a target material of preselected characteristics positioned with respect to said window so that the beta particles passing through the window will strike the target to produce modulated X radiation from said target.

4. Apparatus for producing a modulated beam of monoenergetic beta rays, which comprises means for providing a narrow beam of beta particles having a distribution of energy values, a magnetic field of constant intensity positioned in the path of and perpendicular to said beta ray beam for deflecting the beta particles of said beta ray beam at each energy level an amount proportional to the energy level of each particle, a first radiation shielding means positioned in the path of said deflected particles, said shielding means having an aperture therein for admitting through said aperture a portion of said deflected beta particles having a selected energy level while absorbing the remainder thereof to provide a monoenergetic beam of beta rays passing through said aperture, a second radiation shielding means having an aperture therein, and means for producing a magnetic field of continuously varying intensity in the path of and perpendicular to said monoenergetic beam, said magnetic field operating to deflect the same across said aperture in said second shielding means whereby a modulated beam of monoenergetic beta particles issues from said last-mentioned aperture.

5. Apparatus for producing a modulated beam of X-rays having a selected maximum energy less than the maximum energy of a source of beta rays, which comprises means for providing a narrow beam of beta particles having a distribution of energy values, a magnetic field of constant intensity positioned in the path of and perpendicular to said beta ray beam for deflecting the beta particles of said beta ray beam at each energy level an amount proportional to the energy level of each particle, a first radiation shielding means positioned in the path of said deflected particles, said shielding means having an aperture therein for admitting through said aperture a portion of said deflected beta particles having a selected energy level while absorbing the remainder thereof to provide a monoenergetic beam of beta rays passing through said aperture, a second radiation shielding means having an aperture therein, means for producing a magnetic field of continuously varying intensity in the path of and perpendicular to said monoenergetic beam, said magnetic field operating to deflect the same across said aperture in said second shielding means whereby a modulated beam of monoenergetic beta particles issues from said last-mentioned aperture, and a target of preselected characteristics positioned in the path of said modulated beam of monoenergetic beta particles for generating X-rays when struck thereby.

(References on following page)

References Cited by the Examiner

UNITED STATES PATENTS

| | | | |
|---|---|---|---|
| 2,527,512 | 10/1950 | Arditi | 315—21 X |
| 2,563,333 | 8/1951 | Herzog | 250—83.6 |
| 2,582,981 | 1/1952 | Fua | 250—71.5 X |
| 2,818,507 | 12/1957 | Britten | 250—49.5 X |
| 2,847,581 | 8/1958 | Clark | 250—106 X |
| 2,941,077 | 6/1960 | Marker | 250—49.5 |
| 3,046,430 | 7/1962 | Green | 250—106 X |

OTHER REFERENCES

"Atomic Energy," by Samuel Glasstone, Van Nostrand Company, Inc., New York, 1958.

RALPH G. NILSON, *Primary Examiner.*

UNITED STATES PATENT OFFICE
CERTIFICATE OF CORRECTION

Patent No. 3,247,376          Dated March 10, 1970

Inventor(s) Neil E. Handel

It is certified that error appears in the above-identified patent and that said Letters Patent are hereby corrected as shown below:

Column 3, lines 12 and 13, "neither monoenergetic nor homogeneous, in that there energy levels." should read --- varying numbers of beta particles at many different energy levels.---

SIGNED AND
SEALED

JUL 14 1970

(SEAL)
Attest:

Edward M. Fletcher, Jr.
Attesting Officer

WILLIAM E. SCHUYLER, JR.
Commissioner of Patents